United States Patent [19]

Makita

[11] Patent Number: 4,470,489

[45] Date of Patent: Sep. 11, 1984

[54] SYSTEM FOR CONTROLLING A POWER TRANSMISSION OF A FOUR-WHEEL DRIVE VEHICLE

[75] Inventor: Fujio Makita, Hachioji, Japan

[73] Assignee: Fuji Jukogyo Kabushiki Kaisha, Tokyo, Japan

[21] Appl. No.: 399,513

[22] Filed: Jul. 19, 1982

[30] Foreign Application Priority Data

Jul. 25, 1981 [JP] Japan ................................ 56-116596

[51] Int. Cl.³ ...................... B60K 41/02; F16D 25/12; F16D 43/20

[52] U.S. Cl. ............................... 192/3.58; 192/0.096; 180/6.26; 180/76

[58] Field of Search .................. 192/3.58, 3.57, 0.096, 192/0.052, 0.01; 180/6.24, 6.26, 76, 140; 74/645

[56] References Cited

U.S. PATENT DOCUMENTS

| | | | |
|---|---|---|---|
| 2,789,646 | 4/1957 | Boeard | 180/6.26 |
| 3,165,946 | 1/1965 | Wayman | 74/645 |
| 3,963,085 | 6/1976 | Vinton | 180/44 R |
| 4,175,638 | 11/1979 | Christensen | 180/140 |
| 4,180,138 | 12/1979 | Shea | 180/76 X |

FOREIGN PATENT DOCUMENTS 1287029  8/1972  United Kingdom .

Primary Examiner—George H. Krizmanich
Attorney, Agent, or Firm—Martin A. Farber

[57] ABSTRACT

A system for a four-wheel drive vehicle for automatically changing a power transmission system of the engine of the vehicle from four-wheel driving system to two-wheel driving system in accordance with the steering angle during the turning of a corner. The transmission system is provided for transmitting a power from the engine to main driving two-wheel, and a fluid pressure controlled friction clutch is provided for transmitting the power of the engine to two wheels other than the main driving two-wheel. A steering angle sensor is provided for producing a steering angle signal dependent on the steering angle. A control system is provided to respond to the steering angle signal for decreasing the pressure of the pressure oil applied to the clutch thereby to cause the slip of the clutch during the turning of the corner.

2 Claims, 4 Drawing Figures

SYSTEM FOR CONTROLLING A POWER TRANSMISSION OF A FOUR-WHEEL DRIVE VEHICLE

BACKGROUND OF THE INVENTION

The present invention relates to a system for a four-wheel drive vehicle for automatically changing the transmission system of the vehicle from two-wheel drive system to four-wheel drive system or vice versa according to driving conditions.

In a well-known four-wheel drive vehicle, a power transmission system for the two-wheel driving is selectively converted to the four-wheel driving system by engaging a clutch which is manually operated by a select lever.

Such a four-wheel drive vehicle is preferably driven by the two-wheel driving system on paved dry surfaces. If all four-wheels are driven on such the dry surface, an amount of tire scraping occurs because of slight differences in effective wheel radii caused by inevitable differences in tire inflation, tread wear or variation in loading. In addition, when the vehicle negotiates corners, braking phenomenon called "tight corner braking" will occur at a sharp corner. This is caused by the reason that the front wheels run through an arc of greater radius than that of the rear wheels and therefore tend to rotate faster than the rear wheels. This will result in increase of tire wear and fuel consumption and decrease of driveability.

SUMMARY OF THE INVENTION

The object of the present invention is to provide a system for controlling a power transmission of a four-wheel drive vehicle which is provided with a fluid pressure controlled friction clutch for selectively transmitting a power of an engine for establishing a four-wheel driving system. The system is so arranged to decrease the friction of the clutch for preventing the tight corner braking when the vehicle negotiates a corner.

According to the present invention, a steering angle sensor is provided for producing an output signal dependent on the steering angle. A control system is provided to respond to the steering angle signal for decreasing the pressure of the pressure oil applied to the clutch thereby to cause the slip of the clutch during the turning of the corner.

The present invention will be more apparent from the following description made with reference to the accompanying drawings.

DETAILED DESCRIPTION OF THE PREFERRED EMBODIMENTS

Figure 1:
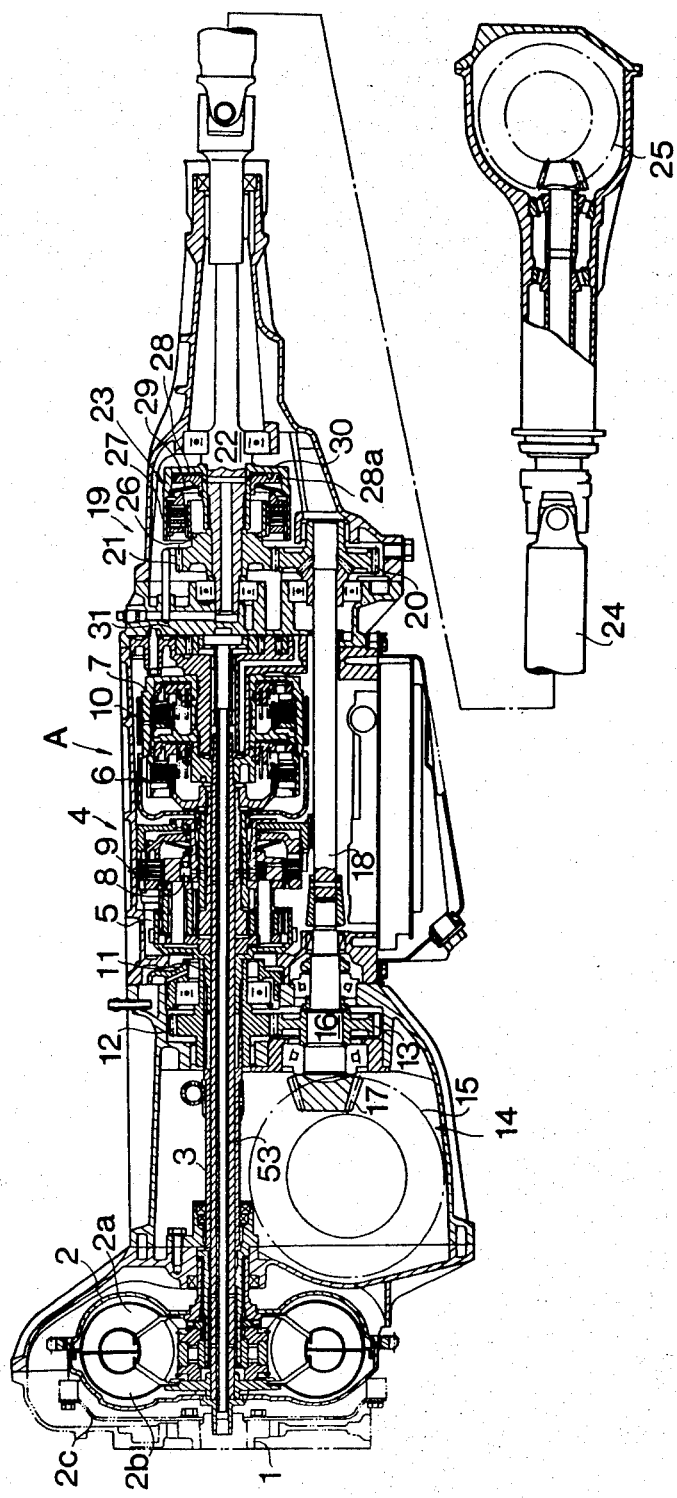
FIG. 1 is a sectional view showing a transmission system used in a system according to the present invention.

Referring to FIG. 1, numeral 1 designates a crankshaft of an internal combustion engine mounted on a vehicle. The crankshaft 1 of the engine is connected with an automatic transmission A.

The automatic transmission A comprises a torque converter 2 operatively connected to the crankshaft 1, an automatic transmission device 4, and a final reduction device 14 for front wheels.

The torque converter 2 comprises a pump impeller 2a and a turbine 2b. The pump impeller 2a is in direct connection with an engine crankshaft 1 through a drive plate 2c. A turbine shaft 3 is extended from the turbine 2b to the automatic transmission device 4.

The automatic transmission device A comprises a planetary gear 5, clutches 6 and 7, a one-way clutch 8, a brake 9, and a brake band 10.

The output of the automatic transmission device is transmitted to an output shaft 11 on which a gear 12 is securely mounted and which in turn engages with a gear 13. The gear 13 is securely mounted on a shaft 16 which is integral with a drive pinion 17. The drive pinion 17 engages with a crown gear 15 of the final reduction device 14 for the front wheels. The shaft 16 is connected to a transfer drive shaft 18 which extends rearwardly and is connected to a first transfer gear 20 of a transfer device 19. The first transfer gear 20 is engaged with a second transfer gear 21.

The gear 21 is connected to a rear drive shaft 22 through a fluid pressure controlled friction clutch 23. The rear drive shaft 22 is further connected to a final reduction device 25 for rear wheels through a propeller shaft 24.

The fluid pressure controlled friction clutch 23 comprises a series of disks 27 secured to an outer periphery of a hub 26 of the gear 21, a series of disks 29 axially slidably engaged with splines formed on inner periphery of a drum 28 which is formed at an end portion of the rear drive shaft 22, and a piston 28a slidably mounted in a piston chamber 30. The disks 27 and 29 are alternately disposed and the disks 29 are adapted to be pressed against the disks 27 by the piston 28a.

Figure 2:
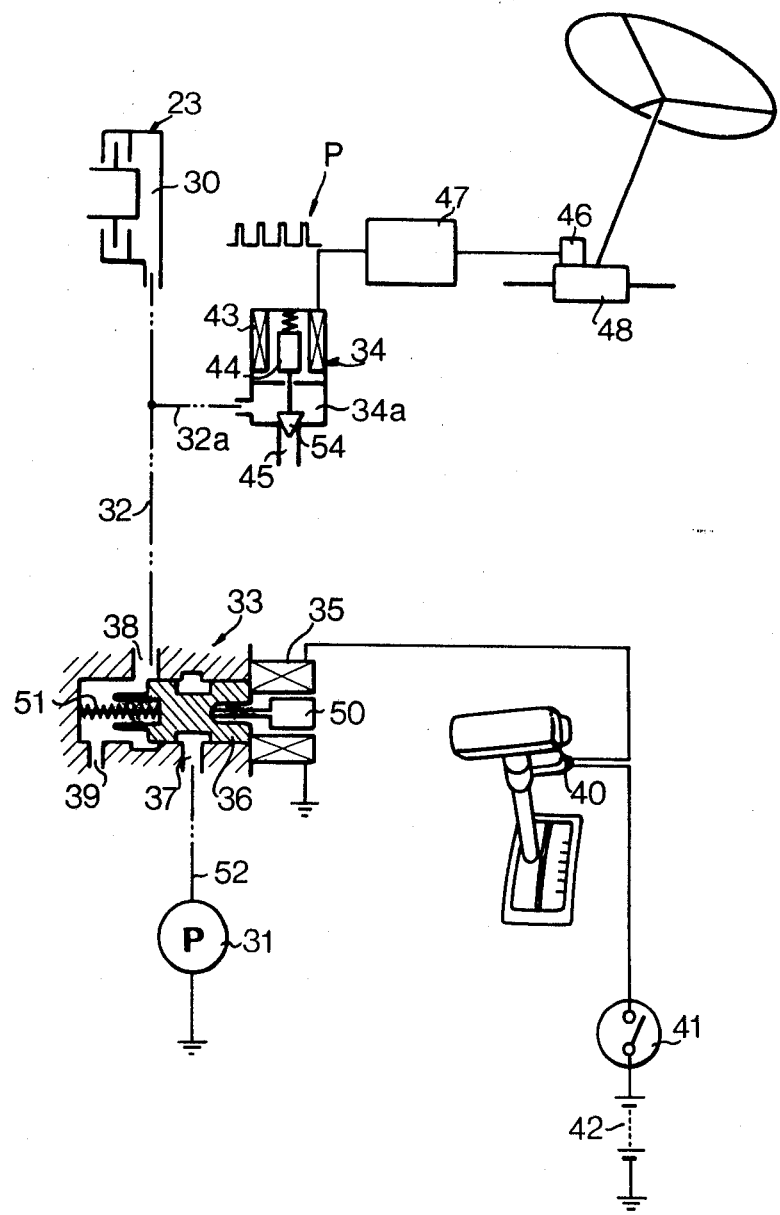
FIG. 2 is a schematic illustration showing an example of the present invention.

Explaining a pressure oil control system with reference to FIG. 2, the control system has an electromagnetic changeover valve 33. The valve 33 comprises a spool 36 connected to a plunger 50 in a solenoid 35, a spring 51 to bias the spool to the right, an inlet port 37, an outlet port 38, and a drain port 39. The inlet port 37 is communicated with an oil pump 31 in the automatic transmission device 4 through a passage 52 and the outlet port 38 is communicated with the piston chamber 30 of the friction clutch 23 by a passage 32. The oil pump 31 is connected to the turbine 2b by an oil pump driving shaft 53 extending in the turbine shaft 3. The solenoid 35 is electrically connected to a battery 42 via four-wheel drive switch 40 and an ignition switch 41.

In the condition of de-energized state of the solenoid 35, which is illustrated state, the inlet port 37 is closed and the outlet port 38 is communicated with the drain port 39. Thus, the friction clutch 23 is disengaged. When the solenoid 35 is energized, the spool 36 is shifted to the left by the plunger 50, so that the drain port 39 is closed and inlet port 37 is communicated with the outlet port 38 to engage the clutch 23.

The outlet port 38 is communicated with a chamber 34a of a drain valve 34 through passages 32 and 32a. The drain valve 34 comprises a solenoid 34, a plunger 44, a drain port 45, and a valve body 54 for closing the drain port 45. In order to control the oil pressure applied to the piston chamber 30 of the clutch 23, the drain valve 34 is operated in dependency on the degree of the tight corner braking.

The braking force may be represented by the slip rate between the front wheels and rear wheels and the slip rate may be represented by the steering angle during the turning of a corner. Therefore, in the system of the present invention, the oil pressure applied to the piston chamber 30 is controlled in dependency on the steering angle.

Figure 3:
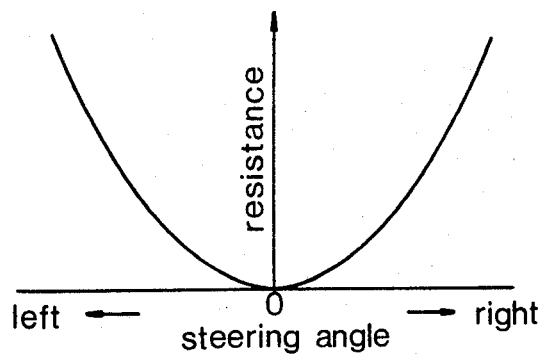
FIG. 3 shows an output characteristic of a sterring angle sensor.
Figure 4:
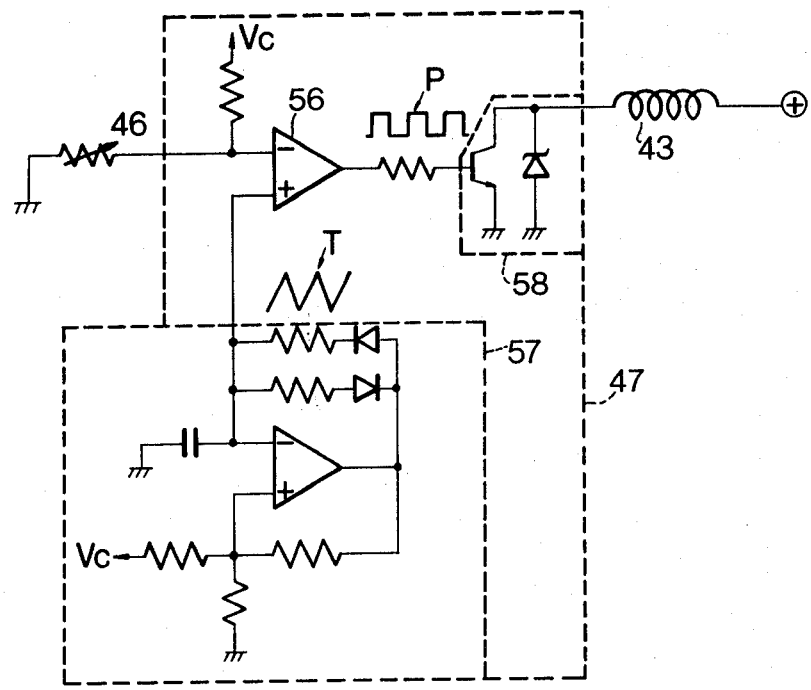
FIG. 4 shows an electric circuit employed in the system of the present invention.

As shown in FIG. 2, a steering angle sensor 46 having an output characteristic shown in FIG. 3 is provided on a steering gear box 48 to measure the steering angle for producing a steering angle signal. The steering angle signal is fed to a control corner and is fed to a control circuit 47. The control circuit 47 compares the steering angle signal with the triangular wave pulse T fed from the triangular wave pulse generating circuit 57 and produces square wave output pulses P, duty ratio of which increases with increase of the steering angle signal. Namely, as the steering angle increases, the duty ratio increases, so that the amount of drain of the drain valve 34 increases.

In operation, when the four-wheel drive switch 40 is turned off, the solenoid 35 is de-energized to establish the drain state of the oil in the piston chamber 30, which is the illustrated state in FIG. 2. Therefore, the power transmission system to rear wheels is cut off, so that the vehicle is driven by front two wheels. If the vehicle negotiates a corner and the output pulses are produced from the control circuit 47, no operation occurs in the friction clutch 23.

When the switch 40 is on, the solenoid 35 is excited to push the spool 36, so that the inlet port 37 communicates with the outlet port 38. Thus, pressure oil is supplied to the clutch 23 to engage it. Therefore, the power of the engine is also transmitted to rear wheels to establish the four-wheel driving.

When the vehicle turns a corner and the steering angle sensor 46 produces a steering angle signal, the control circuit 47 produces output pulses P dependent on the steering angle signal. Thus, the solenoid 43 of the drain valve is excited at a duty ratio of the pulses P to open periodically the drain port 45 to drain the pressure oil. Therefore, pressure of the oil decreases and the friction of the clutch 23 decreases, thereby to cause the slip of the clutch.

Thus, the difference between speeds of front wheels and rear wheels is absorbed by the slip of the clutch, which prevents the tight corner braking. When the steering angle signal disappears, the solenoid 43 is de-energized and the drain port 45 is closed. Accordingly, the transmission system returns to the four-wheel driving system.

From the foregoing it will be understood that the present invention provides a power transmission control system for four-wheel drive vehicle which prevents automatically the tight corner braking, since the clutch for the four-wheel driving slips during the turning of the corner.

While the presently preferred embodiment of the present invention has been shown and described, it is to be understood that this disclosure is for the purpose of illustration and that various changes and modifications may be made without departing from the spirit and scope of the invention as set forth in the appended claim.

What is claimed is:

1. A system for controlling a power transmission of a four-wheel drive vehicle powered by an engine comprising:
   a transmission for transmitting a power of said engine to main driving two-wheel;
   a clutch for selectively transmitting said power to two-wheel other than said main driving two-wheel, said clutch being such that the engagement force thereof can be decreased;
   a steering angle sensor for producing a steering angle signal dependent on the steering angle;
   a control system responsive to said steering angle signal for decreasing said engagement force thereby to occur the slip of said clutch.

2. The system for controlling a power transmission of a four-wheel drive vehicle according to claim 1 wherein said clutch is a fluid pressure controlled friction clutch, and said control system comprises a changeover valve and a drain valve for controlling pressure oil applied to said fluid pressure controlled friction clutch.

* * * * *